(12) United States Patent
Fox et al.

(10) Patent No.: US 7,988,753 B1
(45) Date of Patent: Aug. 2, 2011

(54) METHOD AND APPARATUS FOR RECOVERY AND RECYCLING OF HYDROGEN

(75) Inventors: Edward P. Fox, Grosse Pointe Park, MI (US); Dennis W. Keppers, Liberty Township, OH (US); Daniel M. Barrett, Grosse Pointe Park, MI (US); Larry L. Holt, Lima, OH (US); Edward A. Bullerdiek, Grosse Isle, MI (US); James H. Miller, Liberty Township, OH (US)

(73) Assignee: Marathon Petroleum Co. LP, Findlay, OH (US)

( * ) Notice: Subject to any disclaimer, the term of this patent is extended or adjusted under 35 U.S.C. 154(b) by 0 days.

(21) Appl. No.: 12/583,990

(22) Filed: Aug. 28, 2009

Related U.S. Application Data

(62) Division of application No. 10/891,243, filed on Jul. 14, 2004, now Pat. No. 7,637,970.

(51) Int. Cl.
*B01J 7/00* (2006.01)
*C01B 3/36* (2006.01)
*C01B 3/24* (2006.01)
*C01B 6/24* (2006.01)
*C01B 3/02* (2006.01)
*C01B 3/26* (2006.01)

(52) U.S. Cl. ......... 48/197 R; 48/61; 48/198.1; 423/644; 423/648.1; 423/650; 423/651

(58) Field of Classification Search ................ 48/197 R; 423/644, 648.1, 650, 651
See application file for complete search history.

(56) References Cited

U.S. PATENT DOCUMENTS

| | | | |
|---|---|---|---|
| 4,615,792 A | 10/1986 | Greenwood | |
| 5,002,459 A | 3/1991 | Swearingen et al. | |
| 5,196,110 A | 3/1993 | Swart et al. | |
| 5,211,838 A | 5/1993 | Staubs et al. | |
| 5,221,463 A | 6/1993 | Kamienski et al. | |
| 5,316,448 A | 5/1994 | Ziegler et al. | |
| 5,332,492 A | 7/1994 | Maurer et al. | |
| 5,354,451 A | 10/1994 | Goldstein et al. | |
| 5,417,843 A | 5/1995 | Swart et al. | |
| 5,573,032 A | 11/1996 | Lenz et al. | |
| 5,858,210 A | 1/1999 | Richardson | |
| 6,165,350 A | 12/2000 | Lokhandwala et al. | |
| 6,284,128 B1 | 9/2001 | Glover et al. | |
| 6,350,371 B1 | 2/2002 | Lokhandwala et al. | |
| 6,660,895 B1 | 12/2003 | Brunet et al. | |
| 2002/0061633 A1 | 5/2002 | Marsh | |
| 2004/0129605 A1 | 7/2004 | Goldstein et al. | |

*Primary Examiner* — Alexa D Neckel
*Assistant Examiner* — Matthew J Merkling
(74) *Attorney, Agent, or Firm* — Emch, Schaffer, Schaub & Porcello Co., LPA

(57) ABSTRACT

An apparatus and method for recovering and recycling hydrogen from a reforming process raises the pressure of at least one hydrogen-rich gas stream from at least one catalyst lock hopper and delivers at least a portion of the pressurized hydrogen-rich gas stream to at least one predetermined downstream location. At least another portion of the pressurized hydrogen-rich gas is used to maintain the desired pressure within the hydrogen recovery and recycling process and apparatus.

8 Claims, 2 Drawing Sheets

METHOD AND APPARATUS FOR RECOVERY AND RECYCLING OF HYDROGEN

CROSS REFERENCE TO RELATED APPLICATIONS

This patent application is a divisional patent application of Ser. No. 10/891,243 filed Jul. 14, 2004 now U.S. Pat. No. 7,637,970.

FIELD OF THE INVENTION

The present invention relates to a continuous catalyst regeneration (CCR) reformer system and, in particular, a method and apparatus for recovery of hydrogen from hydrogen-rich gas streams in the CCR reformer system.

BACKGROUND OF THE INVENTION

In the refining industry, continuous catalyst regeneration reformers include a catalyst lock hopper. During the reforming process hydrogen-rich gas streams flow from the catalyst lock hopper. Pressure in an upper chamber of the lock hopper must be maintained in a stable manner in order for the continuous catalyst regeneration reformer to operate efficiently. In the past, the hydrogen-rich gas stream has been routed to a large fuel gas drum. The hydrogen is then used as fuel along with the fuel in the fuel gas drum. The fuel gas drum receives a large flow of fuel flowing through it; thus, the addition of a hydrogen-rich gas stream entering the fuel gas drum does not cause undesired fluctuations in the pressure in the fuel gas drum and the pressure in the fuel drum remains stable. While the hydrogen mixed into fuel gas system is ultimately consumed as fuel, the hydrogen itself is valuable and could be more effectively used in other refining and/or processing systems. This loss of valuable hydrogen makes the entire reforming system less efficient and more costly to operate.

Despite many efforts to improve the reforming operations, it will be appreciated there remains a desire to achieve more efficient recovery of hydrogen while maintaining desired stable pressures throughout the reformer systems.

In addition, improved apparatuses are also desired to allow the system to be controlled within narrow parameters without causing the system to become destabilized.

It is therefore desired to recover hydrogen from such systems so that the hydrogen can be efficiently used at its chemical value rather than being reduced to its fuel value. Such improvements are desired to be integrated into reforming operations in order to retain the benefits of the reforming operations while simultaneously achieving a more efficient overall reforming operation.

There is also a need in many other industries, in addition to petroleum and chemical refining industries, to efficiently recover and recycle hydrogen gas. For example, in many industrial processes, materials are contacted with a catalyst in a reactor system under suitable temperature and pressure conditions to cause a reaction between the components in the materials. For example, in a process such as the catalytic reforming of a petroleum type feed stock, the feedstock undergoes a reforming process in order to produce desired products. These reforming processes often produce hydrogen gas. The hydrogen gas is valuable and it is desired to recover and recycle such hydrogen for use in other refining processes.

Therefore, it is an object of the present invention to provide an improved process and apparatus for the recovery of hydrogen from a reforming process.

It is another object of the present invention to provide a process and apparatus for efficiently recovering hydrogen and recycling that hydrogen for use as a raw material in the refining operation.

It is a further object of the present invention to retain a desired stability of pressure throughout a continuous catalyst regeneration reforming process.

With these and other objects in mind, the invention hereinafter is described in detail, the novel features being particularly pointed out in the appended claims.

SUMMARY OF THE INVENTION

The present invention relates to an apparatus and process for recovering and recycling hydrogen in a reforming operation. In one aspect, the pressure of a hydrogen-rich gas stream is raised so that the hydrogen gas is recovered and then recycled for use elsewhere in the reforming system.

An apparatus for recovering and recycling hydrogen from a reforming process includes at least one pressurizing means for raising pressure of at least one hydrogen-rich gas stream from at least one catalyst lock hopper, and at least one means for delivering at least a portion of the pressurized hydrogen-rich gas stream to at least one predetermined downstream location.

At least another portion of the pressurized hydrogen-rich gas is used to maintain the desired pressure within the hydrogen recovery and recycling process and apparatus In certain embodiments, the apparatus further includes at least one pressure maintaining means for maintaining a desired pressure of the hydrogen-rich gas stream from the catalyst lock hopper.

According to one aspect of the present invention, the pressure at a catalyst lock hopper is stabilized so that any change in pressure in the reforming operation system does not cause alarm or shut down of the system.

According to another aspect, the present invention, the pressure at a catalyst lock hopper is stabilized so that any change in pressure in the refining operation system does not cause excessive use of seal gas elsewhere in the system.

According to another aspect, the present invention provides an apparatus for recovering hydrogen from a reforming process which includes at least one means for raising the pressure of at least one hydrogen-rich gas stream exiting at least one catalyst lock hopper. In certain embodiments, the pressurizing means comprises a compressor.

The catalyst lock hopper is operatively connected to at least one means for maintaining pressure of the hydrogen-rich gas exiting the catalyst lock hopper in a stable condition. In certain embodiments, the pressure maintaining means comprises a surge drum; and in certain preferred embodiments, further comprises at least one compressor and compressor recycle valve (also called a spillback valve) and a feedforward controller means, and, optionally, a feedback controller means.

The pressure maintaining means is operatively connected to at least one means for delivering the pressurized hydrogen-rich gas to at least one predetermined downstream or end use location. In certain embodiments, the delivery means can be the same as the pressurizing means, such as when the pressurizing means is a compressor. The delivery means can include further valves and delivery equipment, as is well understood in the art.

According to another aspect, the present invention provides a method for recovering hydrogen from a reforming process comprising:

raising the pressure of at least one hydrogen-rich gas stream exiting at least one catalyst lock hopper; and delivering the pressurized hydrogen-rich gas stream to at least one predetermined location.

According to another aspect, the present invention further provides at least one or more of the following further steps:

maintaining the pressure of the hydrogen-rich gas stream in a stable condition at the lock hopper and from the lock hopper to the pressure-raising means; and/or, adjusting the pressure of the hydrogen-rich gas stream exiting the catalyst lock hopper to any desired value within previously defined parameters.

In certain embodiments, the method further includes operatively connecting at least one surge drum to the catalyst lock hopper to damp out pressure disturbances in the hydrogen-rich gas stream, thereby keeping the hydrogen-rich gas stream pressure stable and within previously determined parameters;

operatively connecting the surge drum, at least one compressor and at least one compressor recycle valve to at least one feedforward controller, the feedforward controller operatively adjusting the compressor recycle valve by responding to the measured flow of the hydrogen-rich gas stream;

controlling pressure in the catalyst lock hopper using at least one feedback controller which operatively adjusts the compressor recycle valve, thereby adjusting the compressor's capacity to take gas away from the surge drum thereby controlling the pressure in the surge drum and catalyst lock hopper, and/or, optionally activating at least one alarm and/or at least one mechanism to terminate the hydrogen recovery process if certain predetermined parameters are not maintained.

Other objects and advantages of the present invention will become apparent to those skilled in the art upon a review of the following detailed description of the preferred embodiments and the accompanying drawings.

DETAILED DESCRIPTION OF THE PREFERRED EMBODIMENTS

Figure 1:
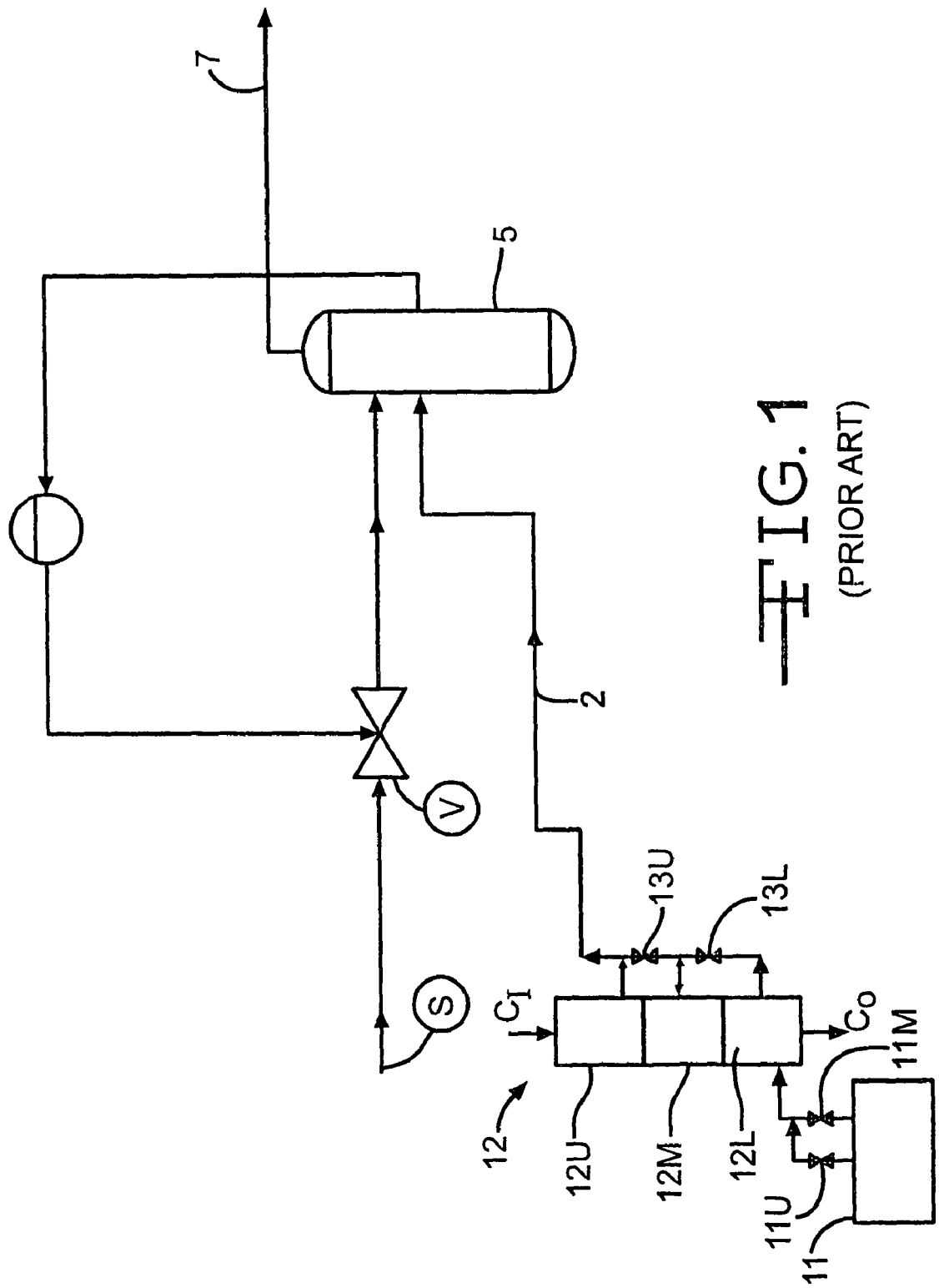
FIG. 1 is a simplified schematic illustration of a prior system where hydrogen gas from a catalyst lock hopper is moved through a fuel gas drum and then to a fuel gas stream.

Referring first to FIG. 1, a simplified schematic illustration of a process for the removal of hydrogen from a prior art continuous catalyst regeneration reformer system is shown. In the prior system, the hydrogen-rich gas stream is sent from a catalyst lock hopper 12 through a pipe 2 to a large fuel drum 5. The fuel drum 5 is also operatively connected to a main fuel supply S and a control valve V. The fuel gas drum 5 provides a stable pressure to the reformer system despite the many valve openings and closings occurring in the system, as will be readily understood by those skilled in the art. The hydrogen gas is mixed with fuel in the fuel drum 5 and then the mixture of hydrogen and fuel flows off to a fuel gas distribution stream 7. In this prior art system, the hydrogen from the catalyst lock hopper 1 was then lost to (or mixed with) the fuel system.

Figure 2:
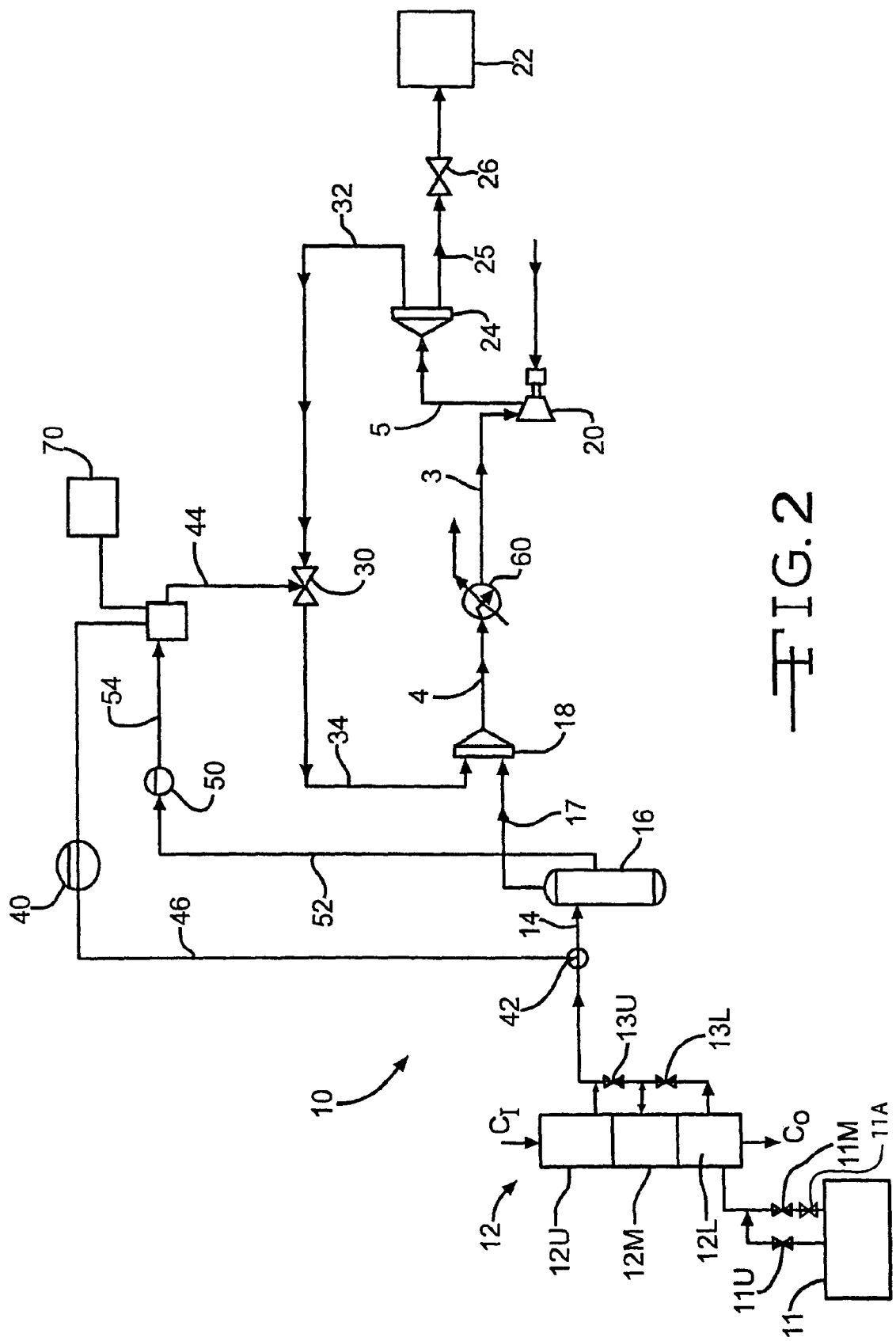
FIG. 2 is a simplified schematic illustration of a system and apparatus of the present invention for a hydrogen recovery system.

Referring now to FIG. 2, a simplified schematic illustration of a hydrogen recovery and recycle apparatus 10 and process of the present invention is shown. A catalyst lock hopper 12 is schematically illustrated as having an upper chamber 12U, a middle chamber 12M and a lower chamber 12L. In use, the catalyst lock hopper 12 receives feed from a supply 11 through a main valve 11M and an auxiliary valve 11A, while a catalyst, generally shown by the arrow $C_I$ (catalyst in), enters the upper chamber 12U, goes through the middle chamber 12M, and exits the lower chamber 12L as shown by the arrow $C_O$ (catalyst out). The catalyst lock hopper 12 further includes at least one upper equalizing valve 13U and at least one lower equalizing valve 13L. During the operation of a continuous catalyst regeneration reformer system it is important to keep the lock hopper upper and lower chamber pressures constant. The upper chamber has a higher pressure than the lower chamber. The pressure of the middle chamber is cycled between matching the upper or lower chamber by opening and closing of the equalizing valves 13U and 13L and closing or opening the auxiliary feed valve 11A and controlling the feed supply valve 11M. The period over which these valves complete a cycle determines the catalyst recirculation rate. The movements of these valves cause periodic peaks and valleys, as well as periods of relatively stable flow, in the flow of the hydrogen-rich gas stream exiting the lock hopper. The pressure of the upper chamber must be kept stable in the face of these disturbances in flow rate.

The hydrogen-rich gas stream flows from the lock hopper 12 through a lock hopper exit pipe 14 to a pressure maintaining means. The pressure maintaining means includes a surge minimizing means, shown herein as a surge drum 16, for damping changes in the pressure of the hydrogen-rich gas stream exiting the catalyst lock hopper.

The hydrogen-rich gas stream is sent from the surge drum 16 to a means 20 for raising the pressure of the hydrogen-rich gas stream. The pressurized hydrogen-rich gas stream is delivered to a downstream system end location, generally shown as 22. It is to be understood that this end location 22 can be any desired system or further use where hydrogen is needed. For example, the location 22 can include delivering the compressed hydrogen gas stream to a hydrogen consuming processing unit or to a main hydrogen recycle compressor, or the like, for use in other systems within a refinery.

From the surge drum 16, the hydrogen-rich gas stream flows to the pressurizing device 20. For ease of illustration, the pressurizing device 20 will be referred to as a compressor, but it should be understood that, in certain embodiments, the pressurizing device 20 can be an ejector or other suitable means for increasing the pressure of the gas. Furthermore, for ease of discussion, the compressor 20 will be referred to as a reciprocating compressor, but it may also be a centrifugal or other type of compressor. In one embodiment of the present invention, the compressor 20 can comprise an otherwise-unused half-cylinder on one side of a piston (called a "throw") in a multi-service reciprocating compressor. The compressor 20 raises the pressure of the hydrogen gas to a predetermined desired level. The compressor 20 delivers at least a portion of the pressurized gas stream to the desired end point or location 22.

It is to be understood, that in preferred embodiments, the compressor 20 is of a sufficient capacity to handle the peak flow from the lock hopper 12. In certain embodiments, the compressor 20 handles at least about 450 lb/hr during the stable periods of flow, but can also handle as little as 80 lb/hr, during the valleys in flow rate, and as much as 750 lb/hr at the peak of flow rate. The compressor 20 also helps to stabilize the pressure in the system 10 by avoiding a build-up of pressure during peak flows or a drop in pressure during a drop in flow from the lock hopper 12. In certain embodiments the compressor is sized to handle the peak flow. In other certain embodiments the compressor is sized to handle more than the peak flow up to several times the peak flow. It is to be understood that the recycle valve is sized to handle the same flow as the compressor.

The present invention achieves the objective of keeping the hydrogen-rich gas stream pressure stabilized throughout its recovery and recycling process. Thus, in certain embodiments, the pressure maintaining means further includes at least one means for regulating, controlling and/or measuring the pressurized hydrogen-rich gas. In certain embodiments, at least a portion of the pressurized hydrogen-rich gas stream is directed to a means 30 for regulating the desired pressure of hydrogen-rich gas in the hydrogen recovery process. In the embodiment shown the regulating means 30 includes a compressor recycle, or spillback, valve 30 which is operatively connected to the compressor 20.

The recycle valve 30 maintains a desired flow of hydrogen gas flow through the compressor 20, especially during non-peak flow parts of the lock hopper cycle. Thus, the recycle valve 30 regulates at least a portion of the pressurized hydrogen-rich gas stream flowing through the compressor 20.

In certain embodiments, the recycle valve 30 has a linear characteristic in order to make the feedforward control calculations more accurate, thus resulting in more stable pressure control throughout the system (as described in detail below).

It should also be understood that during certain operating conditions, the recycle valve 30 is difficult to control quickly enough to keep up with pressure fluctuations occurring in the lock hopper cycle. In certain embodiments, a very large surge drum having much excess capacity is used to minimize any change in the pressure of gas from the surge drum. While such large surge drum 16 allows the recycle valve 30 to respond more slowly, the use of such over-capacity surge drum is not always practical.

In certain embodiments, the pressure maintaining means of the recovery/recycle process 10 further provides a feedforward controller 40 which is operatively connected to the recycle valve 30 and to the supply of hydrogen-rich gas stream exiting the catalyst lock hopper 12. In the embodiment illustrated in FIG. 2, the feed forward controller 40 is operatively connected to the lock hopper exit pipe 14 through a suitable fast responding measuring means, or flow meter, 42. The hydrogen-rich gas stream exiting the lock hopper 12 flows through the meter 42 on its way to the surge drum 16. The recycle valve 30 is operatively connected via a suitable connecting means 44 to the feedforward controller 40. The feedforward controller 40, in turn, is operatively connected to the meter 42 by a suitable connecting device 46. The feedforward controller 40 calculates movements for the recycle valve 30 based on the flow as measured at the meter 42 so that additional flow via the recycle valve 30 compensates for reduced flow from the lock hopper 12. Reduced flow via the recycle valve 30 compensates for peaks in flow from the lock hopper 12, and average flow via the recycle valve 30 in an intermediate position continues during average flow from the lock hopper 12.

In the preferred embodiment of the invention, the recycle valve 30 has a linear characteristic to facilitate matching changes in flows through the recycle valve to changes in the flows from the lock hopper.

In certain embodiments, the feedforward controller 40 is operatively connected to the control systems which move valves 13U, 13L, 11A, and 11M. The feedforward controller 40 calculates movements for the recycle valve 30 based on the signals to move or the measured movements of one or more of the valves 13U, 13L, 11A, and 11M. For example, when the upper equalizing valve 13U opens to depressure the lock hopper middle chamber 12M the feedforward controller 40 can incrementally close the recycle valve 30 to reduce flow via the recycle valve freeing additional compressor 20 capacity to remove the peak flow of hydrogen-rich gas stream exiting the lock hopper 12.

In certain embodiments, the pressure maintaining means of the recovery/recycle process 10 further includes a feedback controller 50 to provide a means to choose the desired pressure of the surge drum 16 by incrementally adjusting the position of the recycle valve 30. Thus, the feedback controller 50, in certain embodiments, helps to further maintain, or fine-tune, a stable, adjustable pressure at the surge drum 16. By further using the feedback controller 50 to adjust the desired positions of the recycle valve 30, a desired pressure of the surge drum 16 is maintained, and thus compensating for any disturbances downstream of the compressor 20. The surge drum 16 is operatively connected to the feedback controller 50 by a suitable connecting means 52. The feedback controller 50 is further connected to the recycle valve 30 by a further connecting means 54.

Also, in certain embodiments, a heat exchanger 60 can be positioned in a stream exiting the surge drum 16 to the compressor 20 to cool the gases, as is well understood in the industry.

In certain specific embodiments, the recovery/recycle system 10 can contain further features. For example, during operation of the recovery/recycle system 10, the hydrogen-rich gas flows from the lock hopper 12 through the pipe 14 and the pressure measuring means 42, to the surge drum 16. The surge drum 16 is connected to a pipe 17 which is connected to a suitable mixing device, or piping junction, 18. The mixing device 18 in connected via a pipe 4 to the heat exchanger 60. The heat exchanger 60 is connected via a pipe 3 to the compressor 20. The compressor 20 is connected via a pipe 5 to a separator device, or piping tee, 24. Pressurized hydrogen-rich gas flows through a pipe 25 and a valve 26 to the further processing location 22.

The separating device 24 is connected to the recycle valve 30 via a pipe 32. The recycle valve is connected to the mixing device 18 via a pipe 34. A further pipe 34 delivers this further portion of the pressurized hydrogen-rich gas from the recycle valve 30 to the mixing device 18, and back to the compressor 20.

The feedforward controller 40 and the feedback controller 50 allow the system 10 to be fine-tuned and to allow the hydrogen recovery/recycle system 10 to be kept in a stable pressurized condition whereby any fluctuations in flow and/or pressure are greatly minimized or eliminated.

It is to be understood that the recovery/recycle system 10 can be operatively connected to at least one alarm and/or at least one mechanism 70 for terminating the hydrogen recovery/recycle process if such desired predetermined parameters are not met. However, with the process and apparatus of the present invention, the continuous catalyst regeneration reforming process and the recovery/recycle process 10 operate more efficiently, more safely and more uniformly such that any potential process terminating events are greatly minimized or eliminated.

It is to be further understood that the present invention is not constrained to a fixed compressor suction pressure that must operate at average flow conditions. The system is also not restricted to a fixed surge drum pressure. Rather, the pressure maintaining means (comprising, in certain preferred embodiments, the recycle valve, the feedforward controller and the feedback controller) maintain and adjust at any desired pressure, the compressor capacity and flow rate through the surge drum 16, and the compressor 20 of the hydrogen recovery/recycle system 10.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A method for recovering and recycling hydrogen from a reforming process comprising:
   pressurizing of at least one hydrogen-rich gas stream exiting at least one catalyst lock hopper to a desired pressure,
   delivering at least a portion of the pressurized hydrogen-rich gas stream to at least one predetermined location;
   maintaining at least the pressure of the hydrogen-rich gas stream in a stable condition prior to the pressurized hydrogen-rich gas stream being delivered to the predetermined location;
   maintaining the desired pressure of the hydrogen-rich gas stream by minimizing surges or changes in the hydrogen-rich gas stream exiting the catalyst lock hopper by flowing the gas stream exiting the lock hopper through a surge minimizing means;
   further maintaining the desired pressure level of the hydrogen-rich gas stream by directing at least a portion of the pressurized hydrogen-rich gas stream to a means for regulating the desired pressure of hydrogen-rich gas in the hydrogen recovery process; and
   further maintaining the desired pressure level of the hydrogen-rich gas stream by controlling the regulating means with a first, or feedforward, controller means to keep the hydrogen-rich gas stream within previously determined parameters.

2. The method of claim 1, further comprising:
   further maintaining the desired pressure of the hydrogen-rich gas stream by measuring the flow rate of the hydrogen-rich gas stream from the catalyst lock hopper prior to the hydrogen-rich gas stream being pressurized.

3. The method of claim 2, further comprising:
   further maintaining the desired pressure of the hydrogen-rich gas stream by sensing the signals to move of at least one valve on the catalyst lock hopper.

4. The method of claim 2, further comprising:
   further maintaining the desired pressure of the hydrogen-rich gas stream by sensing the position of at least one valve on the catalyst lock hopper.

5. The method of claim 3, further comprising:
   further maintaining the desired pressure of the hydrogen-rich gas stream by controlling at least one second, or feedback, controller means operatively connected to the surge minimizing means and the regulating means to further maintain the hydrogen-rich gas stream pressure at a desired pressure.

6. The method of claim 1, further comprising:
   maintaining the hydrogen-rich gas stream pressure above a previously determined pressure of the catalyst lock hopper, whereby, if the pressure of the hydrogen-rich gas stream falls below a desired value, at least a portion of the hydrogen recovery process will be terminated.

7. The method of claim 5, further comprising:
   activating at least one alarm and at least one mechanism to terminate the hydrogen recovery process.

8. The method of claim 1 wherein the surge minimizing means is a surge drum.

\* \* \* \* \*